United States Patent [19]
MacDuff

[11] 3,729,169
[45] Apr. 24, 1973

[54] ADAPTIVE BRAKING SYSTEM WITH HYDRAULICALLY POWERED MODULATOR

[75] Inventor: Stanley I. MacDuff, Daytona Beach, Fla.

[73] Assignee: The Bendix Corporation, South Bend, Ind.

[22] Filed: June 25, 1971

[21] Appl. No.: 156,648

Related U.S. Application Data

[62] Division of Ser. No. 831,949, June 10, 1969, Pat. No. 3,610,702.

[52] U.S. Cl. ..................251/129, 251/141, 303/21
[51] Int. Cl. ...............................................F16k 31/06
[58] Field of Search..............................251/141, 129

[56] References Cited

UNITED STATES PATENTS

| | | |
|---|---|---|
| 2,735,644 | 2/1952 | Bishofberger.....................251/129 X |
| 3,202,182 | 8/1965 | Haviland..........................251/129 X |
| 3,361,161 | 1/1968 | Schwartz.........................251/141 X |
| 3,140,073 | 7/1964 | Finck, Jr. .............................251/129 |
| 3,464,668 | 9/1969 | Jacob...................................251/129 |
| 3,471,119 | 10/1969 | Risk..................................251/129 X |
| 3,521,854 | 7/1970 | Lieber et al. .........................251/129 |

*Primary Examiner*—Arnold Rosenthal
*Attorney*—Ken Decker

[57] ABSTRACT

An adaptive braking system for a motor vehicle including a hydraulically actuated brake pressure modulator operatively controlled by solenoid valve means being responsive to wheel deceleration sensing means via computer means.

6 Claims, 4 Drawing Figures

ADAPTIVE BRAKING SYSTEM WITH HYDRAULICALLY POWERED MODULATOR

This application is a division of U.S. Pat. application Ser. No. 831,949, filed June 10, 1969 now U.S. Pat. No. 3,610,702.

SUMMARY OF THE INVENTION

This invention relates to an adaptive braking system for use with a motor vehicle. More specifically, it relates to use on a vehicle equipped with hydraulic booster brakes such as those illustrated in U.S. application Ser. No. 794,472, now U.S. Pat. No. 3,532,027, having in common with this application the same assignee.

It is an object of this invention to provide an adaptive braking system employing a novel hydraulically actuated brake pressure modulator.

It is an object of this invention to provide an adaptive braking system employing a novel hydraulically actuated brake pressure modulator including novel solenoid valve means for control of said modulator.

It is an object of this invention to provide a hydraulically actuated brake pressure modulator including an improved check valve means.

Other objects and features of the invention will be apparent from the following description of the adaptive braking system taken in connection with the accompanying drawings.

DETAILED DESCRIPTION OF THE INVENTION

Figure 1:
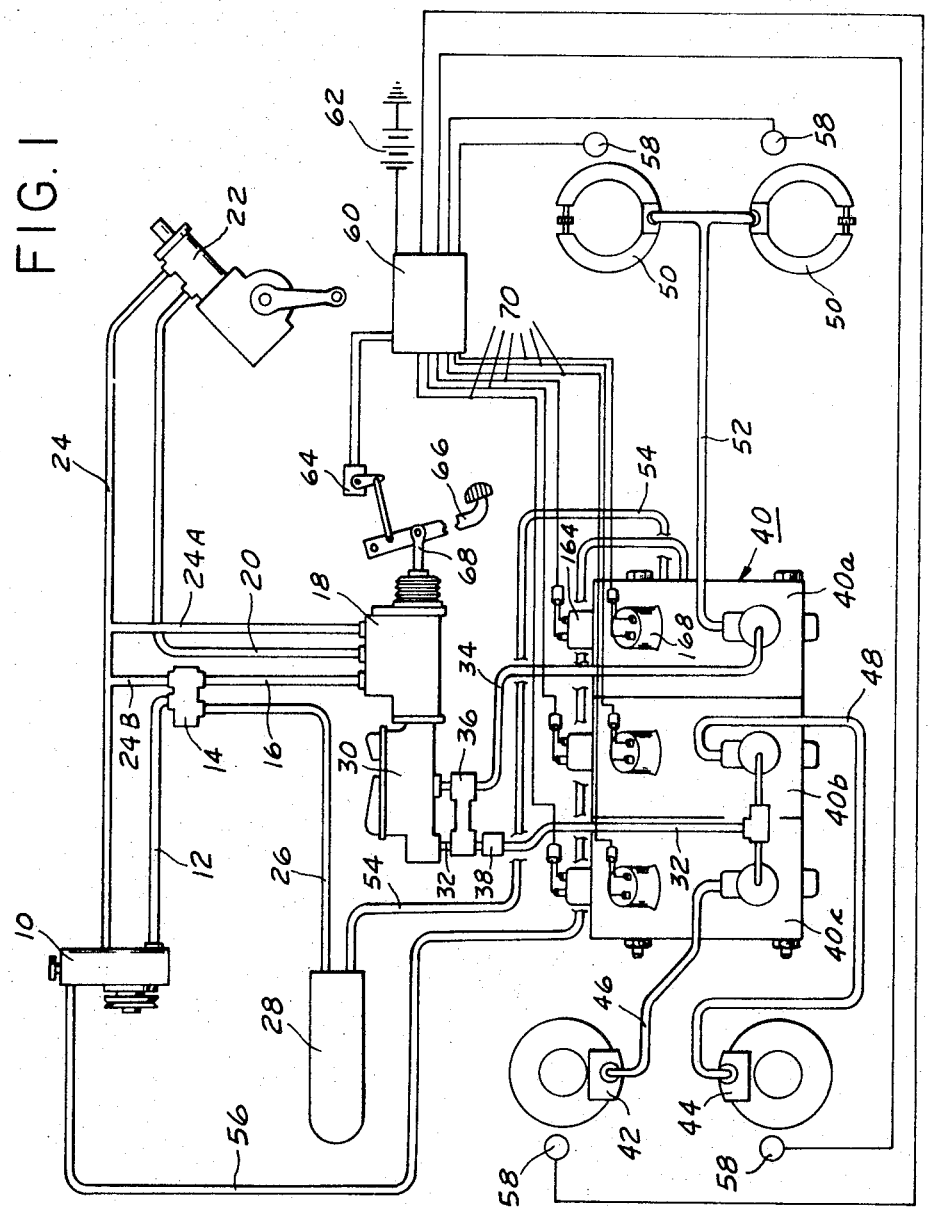
FIG. 1 is a diagrammatic view of a vehicle hydraulic braking and steering system including an adaptive braking system equipped with hydraulic modulators.

Referring now to the drawings, the system of FIG. 1 is operated with fluid flow and pressure from a pump 10 which is belt driven from the vehicle engine (not shown). The fluid delivered by the pump 10 passes through a fluid conduit 12 to a conventional accumulator charging valve 14. The fluid leaves the charging valve 14 through a conduit 16 and enters the power brake booster 18. From the brake booster 18 the fluid passes through a conduit 20 and enters the control valve of the steering gear 22. The fluid is returned from the steering gear 22 to the reservoir of the pump through a return conduit 24. Branches of the return conduit 24A and 24B receive return fluid from the brake booster 18 and the accumulator charging valve 14 and join with conduit 24 to return this fluid to the pump reservoir. In the manner well known in the art, the accumulator charging valve 14, when required, delivers pressurized fluid through a conduit 26 to an accumulator 28 so that the pressure in the accumulator 28 is maintained somewhere between suitable predetermined limits; for example, a maximum of 1,000 psi and a minimum of 800 psi. The brake booster 18 operates a conventional split master cylinder 30 which delivers fluid through front brake connections 32 and rear brake connections 34 which are connected to a suitable warning switch 36 and a metering valve 38 which function in a manner well known to the art. A hydraulic modulator 40 receives brake system fluid from conduits 32 and 34 and delivers this fluid to individual front disc brakes 42 and 44 through conduits 46 and 48, respectively, and also delivers braking fluid to a pair of rear drum brakes 50 through a conduit 52. The hydraulic modulator 40 receives high pressure hydraulic fluid from the accumulator 28 through a conduit 54 and returns the hydraulic fluid to the reservoir of the pump 10 through a conduit 56.

Each of the wheels of the vehicle is provided with an electrical speed sensor 58, each of which transmits signals relative to the speed of its wheel to an adaptive braking system amplifier 60 which is supplied with electrical power from the vehicle battery 62 and which may be energized in the well known manner by operation of a brake pedal switch 64 at the time that the brake is energized by operation of the brake pedal 66. The pedal 66 is operatively connected to the brake booster 18 by means of a link 68. A group of electrical circuits 70 connect the adaptive braking amplifier 60 to solenoid valve means which form components of the hydraulic modulator 40, the structure and function of which, will be more fully described hereinafter. In general, however, electrical signals are provided to the hydraulic modulator 40 which result in reducing or increasing the braking pressure transmitted to the wheel brakes through the conduits 46, 48 and 52. More specifically, control signals will be generated by the adaptive braking amplifier in response to signals received from the wheel speed sensors combined with the application of logic within the amplifier in a manner which does not form a part of this invention and which therefore will not be described in detail. For purposes of reference, the logic and amplifier circuitry could be of the type described and illustrated in U.S. application Ser. No. 673,651, having in common with this application the same assignee.

Figure 2:
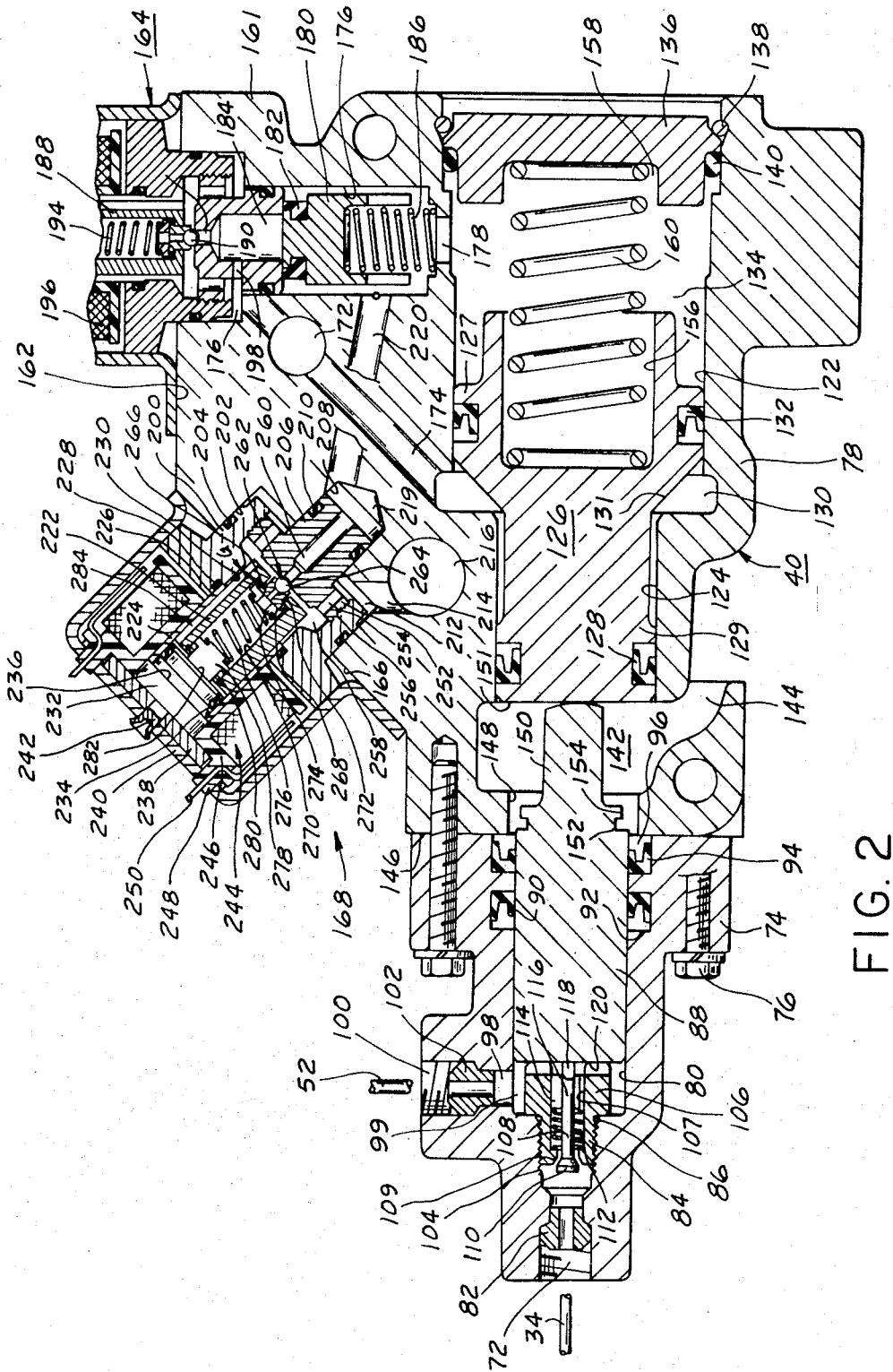
FIG. 2 is a longitudinal section view through a single hydraulic modulator.

Reference is now made to FIG. 2, which shows, in section view, a portion of the hydraulic modulator designated generally by the numeral 40. The hydraulic modulator as shown in FIG. 1 has three identical modulator portions 40a, 40b and 40c; portions 40b and 40c are used in cooperation with the front wheels 42 and 44 and portion 40a for the rear brakes 50. To simplify further discussion of the modulator 40, only the portion 40a of the modulator 40, providing braking pressure to the rear brakes of the vehicle, will be discussed in detail. The conduit 34, bringing pressurizeable hydraulic fluid from the master cylinder 30, enters the threaded port 72 formed in a separate brake system body casting or housing 74 which is attached by a pair of cap screws 76 to a second casting or housing 78 which will be referred to as the hydraulic or power system body casting or housing. The port 72 is formed in a stepped longitudinal bore 80 which is provided (in progression from left to right) with a tube seat insert 82, a spring closed check valve assembly 84 screwed into a threaded portion of the bore 80 and sealed against leakage past the threads by an O-ring seal 86, and lastly a piston 88 closely fitted in an enlarged cylindrical portion of the bore 80. The piston 88 is sealed against external leakage by a U-cup seal 90 seated in an annular groove 92 and is sealed against the entrance of contaminants or air by a second U-cup seal 94 seated in an annular counterbore 96 in the right hand end of the brake body casting 74. A passage 98 extends laterally from the annular portion or chamber 99 of the bore 80 between the check valve assembly 84 and the piston 88, and leads to a threaded port 100 provided with a tube seat insert 102 by means of which connections are made to rear brake conduit 52 extending to the rear brakes 50. The check valve assembly designated generally by the numeral 84 comprises a plug having threads 104, an enlarged hexagon head 106 and a central drilled passage 107 which is stepped to provide a shoulder 108 and which terminates at its left-wardmost portion in a tapered valve seat 109. A cone headed valve member 110 has its conical head urged toward the seat 109 by a spring 112 seated against the shoulder 108 of passage 107 and further has its other end engaging a valve guide member 114 which receives and supports the stem 116 of the conical headed valve 110. The valve stem guide member 114 is secured to the valve member 110 by a flattened or crimped portion 118 of the stem 116. This crimped portion 118 is trimmed to a predetermined length so that when the left face 120 of the piston 88 is brought into contact with the enlarged hexagon head 106 of the check valve 84 it engages the flattened and trimmed end 118 of the valve stem 116 and lifts the head of valve member 110 a predetermined, closely controlled, small distance off of the seat 109, as is clearly illustrated in the drawing.

Referring now to the hydraulic or power body casting 78, this casting is provided with a stepped bore generally concentric of the bore 80 of the brake body casting and having at its right end an enlarged cylindrical section 122 and immediately to the left thereof, a somewhat smaller cylindrical section 124. A stepped piston 126 formed with two diameters 127 and 129 adapted to fit the two cylindrical bore sections 122 and 124, respectively, is positioned in said bore and provided at its left end with a U-cup seal 128 adapted to prevent leakage of hydraulic fluid from a chamber 130 formed between the two bores 122 and 124. The two piston diameters 127 and 129 are joined by a stepped portion 131. The piston head 127 is provided with a U-cup seal 132 constructed to prevent leakage between the chamber 130 and a chamber 134 formed between the right hand face of the piston 126 and a closure plug 136 which is secured in the right hand end of the large bore 122 by means of a snap ring 138 and which is further sealed against external leakage by means of a ring seal 140. The leftwardmost end of the power section casting 78 is provided with a cylindrical recess 142 somewhat larger in diameter than the bore 124. The cylindrical recess 142 communicates with the atmosphere through an opening 144. The casting 78 terminates in a flat surface 146 having a machined opening 148 slightly larger than the piston 88. The brake section casting 74 is bolted against this flat face surface 146 as previously described, and a reduced diameter portion 150 of the piston 88 extends through the opening 148 and across the cylindrical recess 142 to engage the leftwardmost face 151 of the power section stepped piston 126. The piston 88 is formed with a groove 152 and a flange 154 which are normally positioned within the opening 148 so as to catch any leakage past the seals 90 and 94 and form it into droplets which will drop into the cavity or recess 142 and escape through the opening 144. Since the reduced diameter portion 150 of the piston 88 is equal to the length of stroke or motion of the piston 126, the flange 154 will not move so far to the right as to drip fluid onto the surface of the bore 124 in the power section casting 78.

The power section stepped piston 126 and the closure plug 136 are suitably provided with cavities 156 and 158, respectively, which receive a preloaded compression spring 160 which continually urges the piston 126 to the left so that it contacts the piston 88 and holds its face 120 in contact with hexagon head 106 of the check valve 84. As noted previously, this position of the piston 126 maintains the conical headed valve 110 clear of its seat 109 so that free communication is, at that time, established between ports 72 and 100.

The power section body casting 78 is provided with a vertically extending portion 161, immediately above the power cylinder bores 122 and 124, which is provided with a mounting surface 162 upon which is mounted an inlet solenoid valve means 164 and another mounting surface 166 upon which is mounted an outlet solenoid valve means 168. Hydraulic power fluid is introduced into the vertically extending portion 161 of the casting 78 through a threaded boss 170, as may be seen in FIG. 3. The threaded port 170 is connected by a conduit 54 to the accumulator 28. The threaded port 170 is additionally connected to a cross drilled passage 172 which intersects a passage 174. It is also noted that passage 172 extends axially through the modulator portion 40a so as to supply pressurized fluid in an identical manner to modulator portions 40b and 40c. Passage 174 extends from a recess 176 which forms the inlet chamber for the inlet solenoid valve means 164 to the chamber 130. Thus it will be understood that the chamber 130 is continually supplied with hydraulic fluid under pressure. Immediately below the solenoid valve means 164 is a concentric passage 178 which interconnects with the chamber 134 being located between the power piston 126 and the closure plug 136. A check valve element 180 having a deformable elastomeric sealing ring 182 is normally urged against the bottom of the solenoid valve 164 by a spring 186. At a predetermined pressure level the pressure of fluid in the inlet chamber 176 overcomes the pressure of the spring 186 and hydraulic fluid is permitted to exit from inlet chamber 176 through the discharge passage 184 of the solenoid valve 164 and enter the chamber 134. When the fluid pressure in chamber 134 reaches approximately the level of fluid pressure in chamber 176 the check valve element 180 is again closed which positively prevents exit or even leakage of the hydraulic fluid from the chamber 134 backward through the solenoid valve 164. The normally closed solenoid valve means 164 is provided with an armature 188 which carries a valve ball 190 which is normally seated in a valve seat 192. A spring 194 normally holds the ball 190 in contact with the seat 192. An armature coil 196 (only partially shown) when energized, will cause the armature 188 (only partially shown) to move and raise the ball from the seat so that fluid may freely enter the chamber 134. It is noted here that in some modes of operation, it may be desirable for the solenoid valve 164 to be provided with a by-pass orifice 198 which is continually open so that immediately after a brake pressure reduction, a slow increase in braking pressure will be produced by fluid flow through this orifice, regardless of the fact that the solenoid valve means 164 is closed.

Additional detailed description of the solenoid valve means 164 has been omitted in that it is identical to the structure and function of the solenoid valve means 168, to be discussed more fully hereinafter.

The outlet solenoid valve means 168, which is mounted on surface 166, has a core element 200 seated in a large diameter recess 202 in the casting 78 and is fitted with an O-ring seal 204 in an annular groove to prevent external leakage. The valve means 168 is also provided with a central valve seat element having a cylindrical portion 206 which fits in a smaller recess 208 below the recess 202. The seat element 206 is sealed to the recess 208 by means of O-ring seal 210 installed in a suitable annular groove. There is a chamber 212 formed between the core element 200 and recess 202 which constitutes the outlet chamber of solenoid valve 168. This chamber is connected by drilled passage 214 to a cross drilled passage 216 which leads to a threaded port 218 having a tube seat insert 220. The conduit 56 is connected to port 218 for returning the hydraulic fluid to the reservoir of the pump 10. Passage 216 also extends axially through the modulator portion 40a so as to supply pressurized fluid in an identical manner to modulator portions 40b and 40c.

A chamber 219 is formed between the bottom of the recess 208 and the seat element 206 which constitutes the inlet chamber of the outlet cylinder valve means 168. The chamber 219 is connected by a drilled passage 220 to the passage 178 below the sealing element 182 of the check valve element 180, whereby fluid contained in the chamber 134 is free to communicate with passage 220 and enter the chamber 219 of the outlet solenoid valve means 168.

With reference now specifically to the exhaust or outlet solenoid valve means 168, an armature 222 is closely slidably seated in a non-magnetic tube member 224 which is seated in a counterbored recess 226 formed in the upper surface of the core element 200. An O-ring seal 228, in a suitable annular groove, prevents leakage of hydraulic fluid past the clearance between the non-magnetic tube member 224 and the core element 200. Below the recess 226, the core element 200 is formed with a bore 230 which is larger than the armature diameter to provide a predetermined radial air gap. At the other end of the non-magnetic tube member 224, a pole piece 232 is inserted into the inside diameter of said non-magnetic tube member 224 and sealed against leakage by an O-ring seal 234. A shoulder 236 on pole piece 232 engages the end of the non-magnetic tube member 224 to axially position said pole piece 232. A steel washer 238 and a flanged cup member 240, which is designed to serve both as a magnetic circuit and coil enclosure, are riveted to the pole piece 232 by means of a small integral projection 242 of the pole piece 232. An annular solenoid coil 244 is positioned in the annular recess defined by the core piece 200, non-magnetic tube member 224, pole piece 232, and washer and cup 238 and 240, respectively. This coil 244 is preferably wound upon a molded nylon spool 246 which is formed with lugs 248 projecting through suitable openings in the cup shaped member 240 in which electrical terminal pieces 250 are cemented. The seat element 206 of solenoid valve means 168 has an upper enlarged flange 252 having one or more drilled passages 254 and an external thread 256 by means of which it is threadably assembled into a recess 258 formed in the core piece 200 in concentric relationship with the armature 222. The seat element 206 has a central inlet passage 260 terminating in a ball seat 262 in which is seated a valve ball 264. The valve ball 264 is pressed into a recess in a floating ball carrier 266 of generally cylindrical shape terminating in a radial flange 268. The armature 222 has a central bore 270 which is stepped to a smaller diameter portion 272 at its lower end. The ball carrier element extends through the reduced portion 272 with its flange 268 resting thereon and is held in this position by a spring retainer washer 274 which has a recess which encompasses the flange of the ball carrier 268. Both the cylindrical bodies of the ball carrier 266 and the radial flange 268 have substantial radial clearance with their adjoining member and the flange 268 is a few thousandths of an inch thinner than the depth of the recess in the bottom of the spring retainer 274. This permits the -all carrier 266 to shift radially in relation to the valve centerlines so that the ball can center itself perfectly on the ball seat 262, in spite of any allowance of concentricity in the assembled parts. A spring 276 is compressed into the spring chamber 270 between the spring retainer 274 and another spring retainer 278 which is retained in the upper end of the spring chamber 270 by a snap ring 280. A portion of the spring retainer 278 projects beyond the upper face of the armature and presses against the face of the pole piece 232 so that the spring force is applied to the ball carrier elements 266 to hold the ball 264 on its seat. The spring force of spring 276 must be sufficient to resist the maximum system operating pressure exerted upon the ball on an area determined by the ball seat diameter. To insure prompt release of the solenoid armature 222 after an actuation, a thin non-magnetic shim 282 is placed on the face of the pole piece 232. It is further desirable to make the upper spring retainer 278 of non-magnetic metal. The surface of the armature 222 is formed with one or more longitudinal slots 284 to permit ready passage of hydraulic fluid from one end of the armature 222 to the other. It is further noted that the other solenoid valve means 164 differs from solenoid valve means 168 in that for valve means 164 the pressurized fluid enters from above valve ball 190, whereby the spring 194 need only be heavy enough to assist in returning the armature 188 upon release of the valve, and the pressure differential existing across said valve serves to hold valve 190 securely in contact with the seat 192 when the valve is not energized.

MODE OF OPERATION OF THE INVENTION

Figure 3:
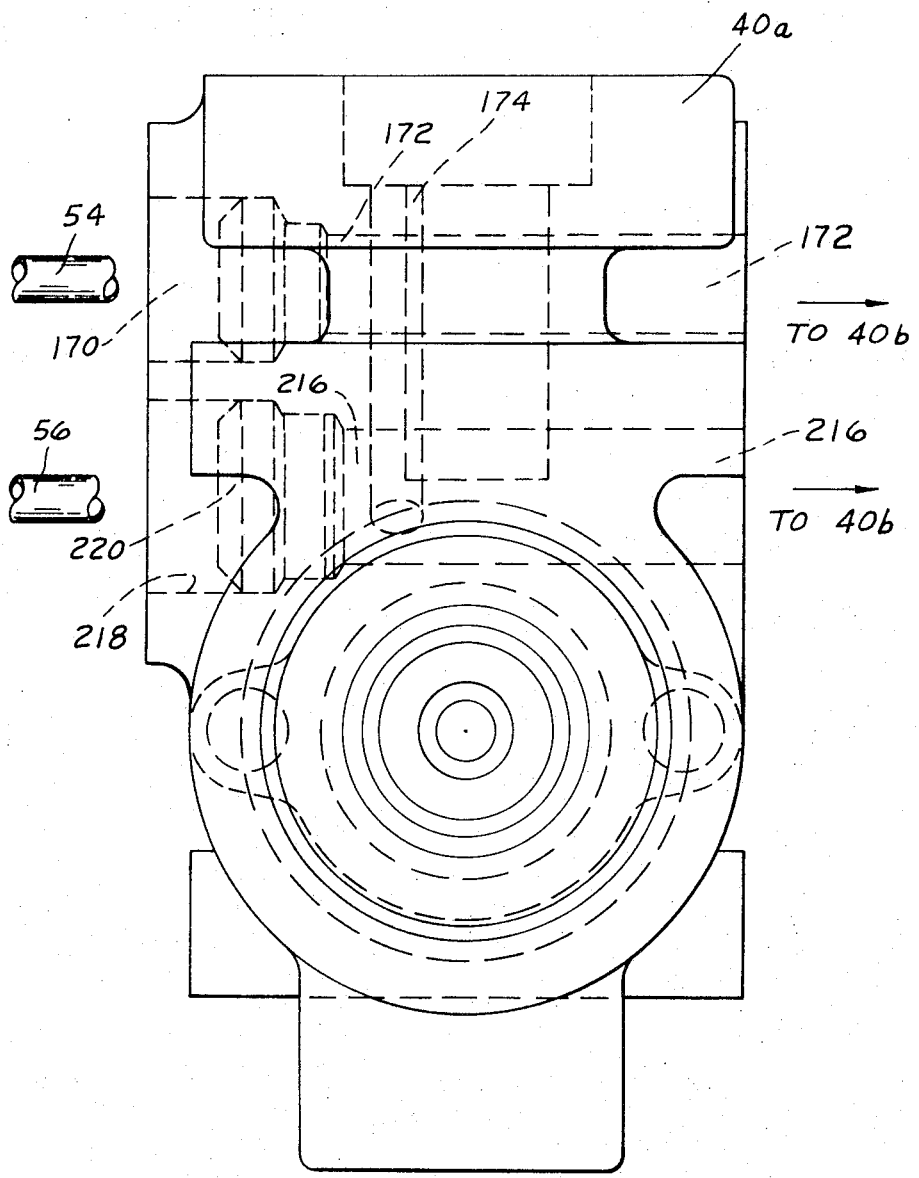
FIG. 3 is an end view of the modulator shown in FIG. 2.
Figure 4:
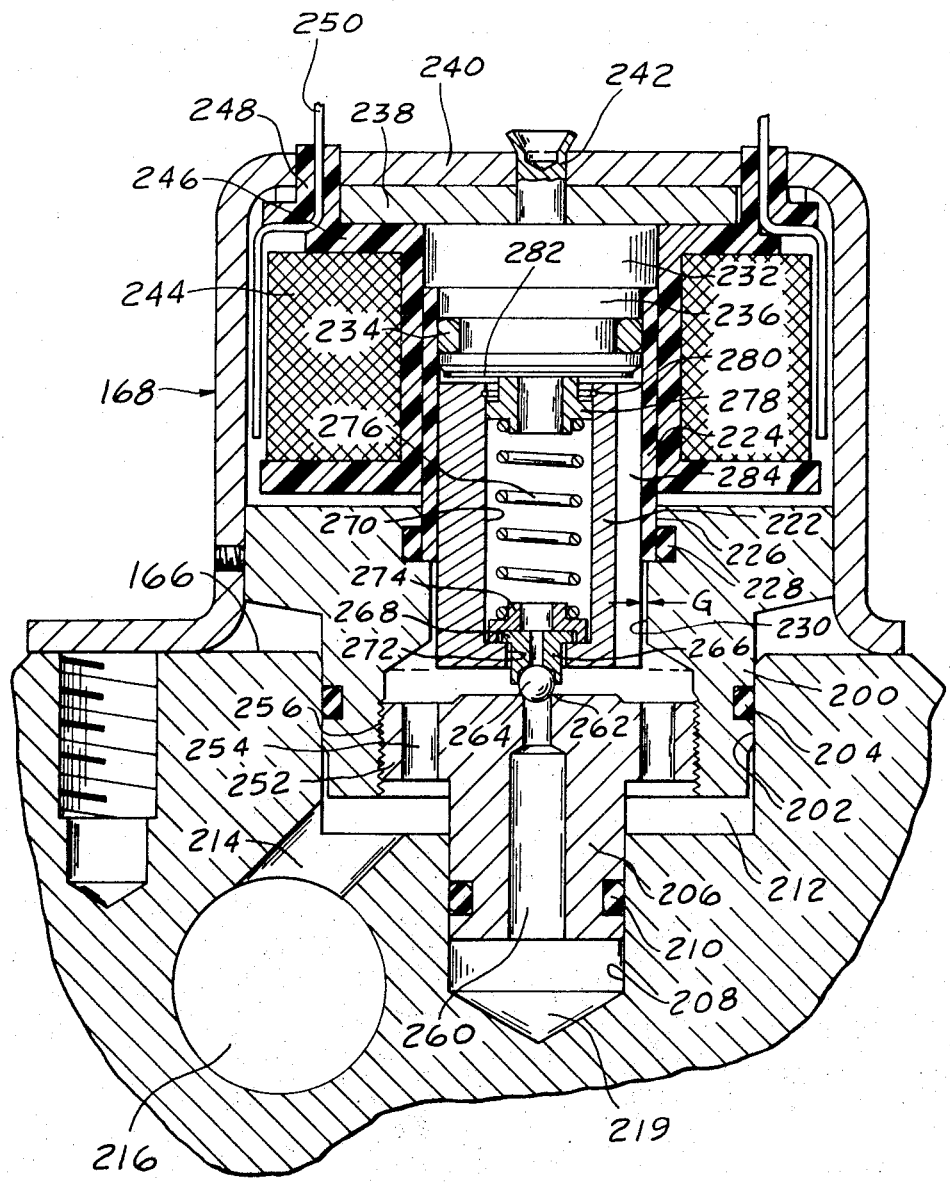
FIG. 4 is an enlarged sectional view of the solenoid valve means shown in FIG. 2.

With reference now to FIGS. 1 and 2, it is assumed that the vehicle is in motion upon a conventional highway with the engine running. The accumulator 28 will contain hydraulic fluid pressure between the previously described limit and fluid from the pump will flow continuously through lines 12, 16, 20 and 24 passing progressively through the accumulator charging valve, the brake booster and the steering valve, the latter valves both being of the open center type. If the driver of the vehicle now applies the brakes by exerting force on the pedal 66, fluid pressure will be raised in lines 12 and 16 and the booster will actuate the master cylinder to discharge fluid to the brake lines 32 and 34 connected to the brakes 42, 44 and 50. Although FIG. 1 shows a four wheel anti-skid system, the description of operation will be limited to the rear wheels only. However, each of the elements 40a, 40b and 40c of the modulator 40 shown in FIG. 1 would function in the same manner. Pressure from the accumulator 28 enters the modulator 40 from the conduit 54 through the threaded port 170 and from there enters the drilled passageway 172, as shown in FIG. 3. Hydraulic fluid is then conducted from passage 172 by passage 174 to the chamber 130 and also to the inlet chamber 176 of the inlet solenoid valve means 164. The fluid passes from the chamber 176 through the bleed port or orifice 198 and past the check valve element 180 into the chamber 134. The pressure in chamber 134 acts upon the entire area of the large diameter portion 127 of the piston 126, whereas the pressure in the chamber 130 acts only upon the stepped portion 131 which represents the difference between the two diameters of the piston portions 127 and 129. Therefore, a substantial force is exerted by the fluid acting on portion 127 of the piston 126 to urge it to the left. This force holds the piston 126 in contact with the piston 88 which, in turn, is held in contact with enlarged head 106 of the check valve assembly 84. This results in the check valve 110 being held off its seat 109 in a normally open position. When the vehicle brakes are applied, fluid from the master cylinder 30 is transmitted to the rear brakes 50 through the conduit 34 past valve 110 and thence through the conduit 52. If maximum braking performance has been demanded of the system by the application of sufficiently high foot pressure on the pedal and the brakes approach a locked condition, the anti-skid system sensors 58 will provide an appropriate signal to the amplifier 60 and the amplifier 60 will produce a signal indicating a need for a reduction of brake pressure. This signal will be applied to the outlet solenoid valve means 168 causing it to lift the valve ball 264 from the valve seat 262, at which time fluid will be permitted to escape from the chamber 134 via the passages 178, 220, 214 and 216. With the release of fluid from the chamber 134, additional flow from the accumulator 28 will flow into chamber 130 forcing the piston 126 to the right and permitting the brake pressure in the bore 80 to move the piston 88 to the right also. Initial movement of the piston 88 permits the check valve 110 to close thus preventing further entrance of brake fluid into the bore 80 and from thence to the brake cylinders through passage 52. Moreover, the continued rightward movement of the piston 88 will expand the volume of the chamber in the bore 80 permitting fluid to flow through the conduit 52 from the wheel cylinders and thereby reduce the brake actuating pressure at the wheel. As will be seen by those skilled in the art, the reduction of braking pressure at the wheel will permit the wheel to re-accelerate and when appropriate conditions have been obtained, the anti-skid system will signal that further reductions in braking pressures are no longer necessary. The valve ball 264 will be returned to its seat 262 and further rightward motion of pistons 126 and 88 will cease. At this point, accumulator pressure will continue to flow into chamber 134 through the bleed port or orifice 198 and piston 126 will start to move slowly towards the left producing a slow increase in braking pressure. When re-acceleration of the wheel has been completed, another signal from the anti-skid system control amplifier 60 may indicate a need for a rapid pressure increase in the brakes and this signal will be transmitted to the inlet solenoid valve means 164, causing the ball 190 to be lifted from its seat 192 so that a much more rapid flow of fluid from the accumulator enters the chamber 134. The anti-skid system is designed to continue to cycle substantially in the manner described so as to continually direct the modulator 40 to either increase or decrease pressure in the conduit 52. In the event that greater pressure is required in the wheel cylinders than was initially supplied at the time the anti-skid function was initiated, the piston 88 will be moved completely to the left raising the check valve 110 and permitting more fluid from the brake system master cylinder 30 to enter the brake wheel cylinders.

In some anti-skid systems the bleed passage 198 may be omitted, in which case upon reduction of braking pressure, the brake pressure can be held at a constant value with both the inlet solenoid valve means 164 and the outlet solenoid valve means 168 closed. In this event, the inlet solenoid valve means 164 might be altered so that the ball 190 is normally open with respect to the valve seat 192. This configuration would allow the accumulator 28 to provide pressure to chamber 134 to insure that pistons 126 and 88 are held in their leftwardmost position so that the check valve 110 would be maintained in an open position. It is obvious that it is mandatory that the check valve 110 be maintained open since if it were permitted to close, braking would be impossible. In the event of failure of the hydraulic system which charges the accumulator 28, the hydraulic modulator 40 is designed to insure continued functioning of the brakes. More specifically, the spring 160 will always bias the piston 126 to its leftwardmost position and hydraulic fluid would enter the chamber 134 either through the bleed passage 198 or the normally open inlet solenoid valve means 164 so that said chamber 134 is always filled with relatively uncompressed fluid. If the brakes under this condition are applied, permitting a build-up of brake fluid pressure in the bore 80 and resulting in substantial forces against the face 120 of the piston 88, these forces would raise the pressure in chamber 134 and will tend to discharge the fluid therefrom. However, the discharge of fluid from this chamber will be prevented by the action of the check valve 180 and by the normally closed discharge solenoid valve means 168. This fluid under pressure acts on the face of the ball 264 and attempts to force it away from its seat 262, but, as previously described, a spring 276 has been designed to exert a force upon this ball which will support pressure in the chamber 219 high enough to resist substantially greater pressure than the brake system can exert against the piston 88. Therefore, the piston 126 is effectively locked against any movement to the right and the check valve 10 will be held open and the brake system will continue to be operational. It is also noted that in the event that the chamber 134 becomes filled with fluid when the vehicle was subjected to extremely low temperatures and the vehicle is subsequently moved into a hot environment, there would be a substantial increase in pressure in the chamber 134 due to the thermal expansion of the hydraulic fluid within the chamber 134. The force of the spring 276 again has been designed to be sufficiently small enough to prevent this pressure from exceeding a safe limit which might result in either severely damaging the piston seal 132 or bursting the housing. In the event that chamber 134 becomes filled with fluid when the system is exposed to a hot environment and is subsequently moved to a cold environment, thermal contraction of the hydraulic fluid within chamber 134 will occur. If the thermal contraction of the fluid is sufficient enough, it will tend to draw a vacuum in chamber 134, which in turn, will draw fluid from passageway 172 through passage 198 and check valve 180 and thus into chamber 134 to compensate for the thermal contraction. It is also noted that the effects of thermal contraction may also be negated by including a check valve between fluid return passage 216 and the chamber 134 to allow fluid flow from passage 216 to chamber 134, or by including a bypass valve between conduits 34 and 52 to allow communication therebetween during any period of time that the pump 10 is not operating or the accumulator 28 is pressurized below a predetermined level.

While the specific details have been herein shown and described, the invention is not confined thereto and other substitutions can be made within the spirit and scope of the invention.

I claim:

1. Solenoid valve means comprising:
   a housing;
   annular coil means operatively connected to a source of electric power for energization thereby and fixedly secured in said housing;
   core means having an opening therethrough fixedly secured to said housing;
   circular valve seat means secured to said core means in coaxial relationship with said opening;
   armature means including a tubular member having a closed end provided with a circular opening therethrough in spaced apart coaxial relationship with said valve seat means;
   said armature means being slidably carried by said coil means and actuated in response to energization of said coil means; and
   a ball valve engageable with said valve seat means for controlling fluid flow therethrough;
   carrier means including a circular member connected to retain said ball valve and extending through said circular opening in radially spaced apart relationship with the wall thereof;
   retaining means including a resilient member carried by said armature means and operatively connected to said carrier means for resiliently holding said carrier means in position axially in said opening;
   said carrier means being slidable radially in said opening to permit axial alignment of said ball valve with said circular valve seat means.

2. Solenoid valve means as claimed in claim 1, wherein:
   said retaining means further includes a spring retaining washer having a circular recess therein;
   said carrier means being provided with a flanged portion slidably retained in said circular recess.

3. Solenoid valve means as claimed in claim 2, wherein:
   said resilient member is a compression spring interposed between a spring retaining portion of said armature means and said spring retaining washer.

4. Solenoid valve means as claimed in claim 1, and further including:
   a pole member fixedly secured to said housing and surrounded by said annular coil means;
   said armature being actuated into engagement with said pole member upon energization of said coil means;
   an annular recess in said pole member;
   an annular recess in said annular core means; and
   a non-magnetic tube member having opposite end portions seated in said annular recesses in said pole member and said core means;
   said non-magnetic tube member slidably containing said armature means and maintaining said armature means in radially spaced apart relationship with said coil means.

5. Solenoid valve means as claimed in claim 4 and further including:
   a thin non-magnetic shim interposed between said pole member and said armature means to ensure prompt magnetic release of said armature means upon de-energization of said coil means.

6. Solenoid valve means as claimed in claim 5, wherein:
   said tubular member is provided with at least one passage therethrough providing fluid communication between opposite ends thereof.

* * * * *